United States Patent [19]

Tokiwa et al.

[11] Patent Number: 5,206,087
[45] Date of Patent: Apr. 27, 1993

[54] BIODECOMPOSABLE OR BIODISINTEGRABLE MOLDABLE MATERIAL

[75] Inventors: Yutaka Tokiwa, Tsuchiura; Masahiro Suzuki, Kounosu; Masatoshi Koyama, Tsukuba, all of Japan

[73] Assignees: Director-General of Agency of Industrial Science and Technology; Chuokagaku Ltd., both of Japan

[21] Appl. No.: 659,958

[22] Filed: Feb. 26, 1991

[30] Foreign Application Priority Data

Feb. 28, 1990 [JP] Japan .................................. 2-45725

[51] Int. Cl.$^5$ .............................................. B32B 19/00
[52] U.S. Cl. .................................. 428/403; 428/35.6; 428/35.7; 428/36.4; 428/327; 428/407; 428/903; 428/325; 428/331

[58] Field of Search .................... 428/403, 35.6, 35.7, 428/36.4, 407, 317.9, 318.4, 331, 327, 903, 325; 220/DIG. 30; 526/914

[56] References Cited

U.S. PATENT DOCUMENTS

| | | | |
|---|---|---|---|
| 3,921,333 | 11/1975 | Clendinning et al. | 47/37 |
| 3,932,319 | 1/1976 | Clendinning et al. | 260/7.5 |
| 4,016,117 | 4/1977 | Griffin | 260/17.4 ST |
| 4,931,488 | 6/1990 | Chiquet | 523/126 |

*Primary Examiner*—Paul J. Thibodeau
*Assistant Examiner*—Hoa T. Le
*Attorney, Agent, or Firm*—Lorusso & Loud

[57] ABSTRACT

A biodecomposable or biodisintegrable moldable material which comprises a mixture of 10–70 vol. % of a natural high molecular substance, 30–70 vol. % of a thermoplastic resin and 0–45 vol. % of a filler.

12 Claims, No Drawings

BIODECOMPOSABLE OR BIODISINTEGRABLE MOLDABLE MATERIAL

BACKGROUND OF THE INVENTION

1. Field of the Invention

The present invention relates to a biodecomposable or biodisintegrable moldable material and a molded article produced therefrom. More particularly, the present invention relates to a biodecomposable or biodisintegrable moldable material wherein a natural high molecular weight substance such as starch or cellulose is incorporated with a specific proportion of a biodecomposable or biodisintegrable thermoplastic resin, and to a molded article produced therefrom.

2. Description of the Prior Art

As various synthetic resin (plastic) articles produced heretofore are devoid of any biodisintegrability, unlike natural high molecular weight substances such as cellulose, a serious problem is encountered in the treatment of waste plastic articles. For example, plastic bags made of polyvinyl chloride are not biodecomposable by the action of microorganisms. Accordingly, waste bags remain in the soil semi-permanently without undergoing any chemical decomposition. Further, movement toward prohibiting or limiting the use of plastic as packaging materials is being encouraged in recent years in Europe and America. Thus, this problem in the treatment of waste plastic articles now becomes one of urgent necessity on a global scale.

In the prior art, products heretofore developed and actually put into practice for solving problems in the treatment of waste plastics have been limited to articles in the form of a sheet or film wherein polyethylene is incorporated with 6-25% by weight of starch. However, such products are poor in starch content so that biodecomposition of starch by microorganisms is not completely attained. In addition, the products still maintain their structure and are not disintegrated into pieces even if the contained starch is completely biodecomposed. On the other hand, if the starch content is increased to overcome the above defect, the intended biodisintegration of the products will certainly take place but a plastic containing starch in a large amount is devoid of any plasticity so that the products, for example, in the form of a sheet are significantly inferior in mechanical properties and are hardly used for the manufacture of molded articles where a secondary processing treatment in required.

Thus, the known conventional biodisintegrable plastics are utterly unsatisfactory in the degree of biodisintegration itself or otherwise poor in mechanical properties and processability.

Under the above circumstances, there is a great demand for developing new type biodisintegrable plastic materials which enable good biodisintegration and prevent deterioration in mechanical properties and thermoformability by incorporation of natural high molecular weight substance with a specific plastic substance capable of being decomposed by microorganisms.

BRIEF SUMMARY OF THE INVENTION

Accordingly, it is an object of the present invention to provide a biodecomposable or biodisintegrable moldable material which overcomes drawbacks of the prior art biodisintegrable resins.

It is another object of the present invention to provide a biodecomposable moldable material comprised of a natural high molecular weight substance incorporated with a specific biodecomposable thermoplastic resin.

It is still another object of the present invention to provide a biodisintegrable moldable material comprised of a natural high molecular weight substance incorporated with a mixture of a specific biodecomposable thermoplastic resin and a non-biodecomposable thermoplastic resin.

It is further object of the present invention to provide the use of the biodecomposable or biodisintegrable moldable material for obtaining a molded article therefrom in a conventional molding means.

Other and further objects, features and advantages of the present invention will be apparent more fully from the following description.

As a result of extensive research made by the present inventors to develop new type biodecomposable or biodisintegrable moldable materials which overcome drawbacks as seen in the prior art similar materials, it has now been found that a biodecomposable or biodisintegrable moldable material can be obtained by incorporating a natural high molecular weight substance or an organic or inorganic filler with a specific proportion of a biodecomposable thermoplastic alone or in mixture with non-biodecomposable thermoplastic resin and is furnished with excellent mechanical properties and moldability. The present invention has been accomplished on the basis of the above finding.

DETAILED DESCRIPTION OF THE INVENTION

In accordance with one embodiment of the present invention, there is provided a biodecomposable or biodisintegrable moldable material which comprises a mixture of 10-70 vol. % of a natural high molecular weight substance, 30-70 vol. % of a thermoplastic resin and 0-45 vol. % of a filler. In this case, the thermoplastic resin comprises a biodecomposable resin alone or together with a non-biodecomposable resin.

In accordance with the present invention, there is also provided a biodecomposable or biodisintegrable moldable material which comprises a mixture of 20-70 vol. % of a filler, 30-80 vol. % of a biodecomposable resin and 0-50 vol. % of a non-biodecomposable resin.

In accordance with the present invention, there is also provided a biodecomposable or biodisintegrable molded article obtained from the above mentioned moldable material.

The natural high molecular weight substance used in the present invention includes, for example, starch obtained from starch-enriched materials such as potato, rice, wheat, corn and tapioca; starch derivatives obtained by copolymerizing starch with a vinyl monomer such as vinyl acetate or an acrylate; plant powders such as sawdust, pulp powder, powdery cellulose, etc.; various cellulose fibers; plant fibers such as cotton or hemp; plant high molecular weight substances such as gum arabic, natural rubber, crystal gum, etc.; and animal and plant proteins such as casein, gelatin and gluten. The bulkness of these high molecular substances is within the range from $4.2 \times 1/10^3 \, \mu m^3$ to $520 \times 10^3 \, \mu m^3$, preferably $4.2 \times 1/10^3 \, \mu m^3$ to $2.2 \times 10^3 \, \mu m^3$. In case of fibrous natural high molecular substances, the thickness of the fibers is less than 100 $\mu m$, preferably 1-50 $\mu m$ while the length of the fibers is less than 10 mm, preferably less than 5 mm. These natural high molecular weight substances are employed usually alone or in mixture of at least two.

The biodecomposable resin used in the present invention includes, for example, polyhydroxybutyrate (PHB) and its derivatives, polycaprolactone (PCL), polyethylene adipate (PEA), polytetramethylene adipate and the like aliphatic polyesters and their derivatives; cycloaliphatic polyesters and their derivatives such as polycyclohexylenedimethyl adipate; copolymers derived from a thermoplastic synthetic resin and a biodecomposable aliphatic polyester; etc. These resins are employed singly or in mixture with at least two.

The non-biodecomposable resin includes, for example, olefinic resins such as polyethylene, polypropylene, polymethylpentene, ethylene-vinyl acetate copolymer and its saponified product; polyester resins such as polyethylene terephthalate, polybutylene terephthalate, etc.; vinyl resins such as polyvinyl chloride, polyvinylidene acetate, their copolymers, etc.; styrene resins such as polystyrene and styrene copolymers; and other resins such as polyamide resins and polycarbonate resins. These resins are employed singly or in mixture with at least two.

The filler used in this invention includes those of known conventional orgainic and inorganic nature and may be in the form of particles, fibers, flakes and other various structures. Illustrative of the filler in the form of particles are, for example, talc, calcium carbonate, clay, silica, alumina, glass powder, metal powder and powdery thermocurable resin. Illustrative of the filler in the form of flake are, for example, mica and metal flake. Illustrative of the filler in the form of fibers are, for example, glass fibers, carbonaceous fibers, asbestos, and mineral fibers. These fillers have a bulkness within the range from $4.2 \times 1/10^3$ $\mu m^3$ to 910 $\mu m^3$, preferably $4.2 \times 1/10^3$ $\mu m^3$ to 600 $\mu m^3$ in terms of average volume. In case of the fibrous fillers, the thickness of the fibers is less than 100 $\mu m^3$, preferably 1-50 $\mu m$, while the length of the fibers is less than 10 mm, preferably less than 5 mm.

The moldable material in the first embodiment of this invention is comprises of 10-70 vol. %, preferably 25-55 vol. % of the natural high molecular weight substance, 30-70 vol. %, preferably 30-50 vol. % of the thermoplastic resin and 0-45 vol. %, preferably 0-20 vol. % of the filler. The thermoplastic resin may be either of the biodecomposable resin or non-biodecomposable resin or may be a mixed resin of the biodecomposable resin and the non-biodecomposable resin. The proportion of the biodecomposable resin based on the mixed resin is within the range of 1-80 vol. %, preferably 20-80 vol. %. It is important in this moldable material that the proportion of the natural high molecular weight substance is at least 10 vol. %, preferably at least 25 vol. %. It has been found by the present inventors that if the proportion of the natural high molecular substance is greater than 10 vol. % in the moldable material, the particles of the natural high molecular weight substance in the resultant molded article will directly bound mutually without being interposed with the resin particles so that the molded article will be furnished with good biodecomposability owing to the natural high molecular weight substance and that the biodecomposability of biodisintegrability of the molded article will be controlled by adjusting the proportion of the natural high molecular weight substance.

The following table (Table 1) shows the result of measuring the biodisintegrability of a sheet made of a mixture of polypropylene and corn starch in relation with the proportion of corn starch therein.

In Table 1, TOC stands for total orgainic carbon quantity dissolved in an aqueous solution as a result of biodecomposition of the corn starch in the sheet. The measurement of TOC is carried out in the same manner as will be described in examples except that $\alpha$-amylase is used as an enzyme, a sheet of 6 cm $\times$ 5 cm $\times$ 0.5 mm in size is used as a sample and the total reaction time is 256 hours by 16 times repeating the reaction of 16 hours.

TABLE 1

| Corn starch incorporated (vol. %) | TOC formed (ppm) |
| --- | --- |
| 0 | 0 |
| 10 | 125 |
| 20 | 410 |
| 30 | 1650 |
| 40 | 4450 |
| 50 | 7470 |

The moldable material of the first embodiment in this invention is produced by charging a high velocity reaction mixer with the natural high molecular weight substance, the thermoplastic resin and the optional filler and stirring the mixture in the mixer at a high velocity under heating. Any conventional mixer such as a Henshell mixer (manufactured by Mitsui Miike Seisakusho), a super mixer (manufactured by Kawata Seisakusho) and the like high velocity vortex mixer can be used for this purpose. As a large amount of such non-melting solid particles (the natural high molecular substance and the optional filler) exists in this high velocity stirring operation under heating, the resin does not form a molten mass even if the temperature reaches the melting temperature of the resins. The resin is divided into microparticles onto the surface of which the solid particles (the natural high molecular weight substance and the filler) are attached. The plural resin microparticles are then mutually combined to form agglomerates of 0.1-20.0 mm in size. In order to form these agglomerates efficiently, the whole was stirred at high velocity for a period of 5-200 seconds, preferably 10-100 seconds at about the melting temperature of the resin.

At the time the agglomerates are formed, the mixture was cooled and solidified and any larger agglomerates of larger than 20 mm in size are pulverized for use in the moldable material. As a means for cooling the mixture, any of the known methods can be employed; for example, the mixture was taken out from the mixer and sprinkled with water or air is blown while the mixture was stirred. If necessary, at a low velocity, or otherwise, the mixture is poured into water or is stirred in a cooling mixer while blowing air.

In case the natural high molecular weight substance, the thermoplastic resin and the optional filler are mixed, an auxiliary substance or substances may be incorporated into the mixture. Such auxiliary substances include antioxidants, surfactants and coloring materials.

The mixture thus obtained comprises plural resin particles mutually fused to form granules onto the surface of which the natural high molecular substance or a mixture of the natural high molecular substance and the filler is bound. These granules are porous an are generally 0.1-20 mm, preferably 0.3-5 mm in size.

The biodecomposable or biodisintegrable molded articles of this invention can be manufactured from the granules as the moldable material by hot molding it into various shapes. Any of the molding methods can be adopted for this purpose, including extrusion molding, injection molding, press molding and calendering. In this invention, a foam-molding method can also be adopted to obtain foamed molding. A general foam-molding method comprises extruding a molten mass of the moldable material incorporated with a foaming agent from a high pressure zone to a low pressure zone. Preferred examples of the foaming agent include a foaming agent of a thermal decomposition type capable of releasing a gas by heating and an orgainic liquid such as a hydrocarbon or a halogenated hydrocarbon having a low boiling point.

As the moldable material may contain a thermally deteriorating natural high molecular weight substance, some device is necessary in this invention to prevent such natural high molecular weight substance form thermal deterioration as far as possible. In general, the natural high molecular weight substances hardly undergo thermal deterioration by heating at a temperature lower than 200° C. for about one hour and do not suffer any deterioration of physical properties, although it depends on the type of the natural high molecular substance. At a temperature higher than 200° C., however, the natural high molecular weight substance is easily susceptible to thermal deterioration. Especially at a temperature high than 230° C., deterioration of the substances in their physical properties becomes distinct even by heating for about 30 minutes. In case the moldable material is subjected to a hot molding, therefore, it is necessary in the present invention to limit the molding temperature and the molding time to ranges where thermal deterioration of the natural high molecular weight substance does not take place. If the melting point of the resin contained in the moldable material exceeds 250° C. so that a higher temperature is needed for hot molding of the material, the use of press molding is recommended to ensure that the hot molding is completed within a short period of time.

Among the molded articles obtained as above, those wherein the resin component consists of the biodecomposable resin exhibit complete biodecomposition to such degree that when the articles are left in soil or water, the natural high molecular weight substance and the resin component constituting the article are entirely biodecomposed, that is to say, the articles disappear. On the other hand, the molded articles wherein the resin component consisting of the non-biodecomposable resin or a mixed resin of the biodecomposable resin and the non-biodecomposable resin retain the non-biodecomposable resin in unchanged state or undissolved state when left in soil or water. However, because such articles additionally contain a large amount of the natural high molecular weight substances, they are easily biodecomposed so that the volume of the articles is remarkably reduced.

In the molded articles obtained from the first embodiment in this invention, those containing 25 vol. % of the natural high molecular weight substance show significant hygroscopic property so that they absorb moisture in air or use to cause deterioration of their mechanical strength. However, this problem can be solved by providing on the surface of the articles with a moisture proof film as will be explained hereinafter.

The moldable material of the second embodiment in this invention comprises 20-70 vol. % of the filler, 30-80 vol. %, preferably 50-60 vol. % of the biodecomposable resin and 0-50 vol. %, preferably 0-20 vol. % of the non-biodecomposable resin. In the moldable material of the second embodiment, it is necessary that the proportion of the filler is 20 vol. % or more, preferably 25-20 vol. % or more. By incorporating the material with such a greater amount of the filler, the resultant molded articles become porous and are increased in the surface area for the biodecomposable resin so that the articles show enhanced biodecomposition velocity and are wholly disintegrated when the articles are subjected to biodecomposition in the soil or water.

This moldable material can be manufactured in the same manner as shown with respect to the moldable material of the first embodiment. On hot molding of this moldable material, no particular limitation is necessary for the hot molding temperature and time as the material is fee of the heat-deterioration of the natural high molecular weight substance. Accordingly, hot molding of this material can be carried out in a conventional method without paying attention to the processing temperature. In order to obtain the molded articles excellent in mechanical strength such as tensile strength, it is preferably to employ a mixed resin of the biodecomposable resin and the non-biodecomposable resin as the resin component. In the case of the mixed resin, the proportion of the biodecomposable resin in the mixed resin is preferably limited to 1-62.5 vol. %, desirably 1-30 vol. %.

Among the molded articles obtained from the moldable material of the second embodiment which is free of the natural high molecular weight substance, those wherein the resin component consists of the biodecomposable resin exhibit complete biodecomposition. On the other hand, the molded articles wherein the resin component consists of the non-biodecomposable resin or a mixed resin of the biodecomposable resin and the non-biodecomposable resin retain the non-decomposable resin in unchanged or undissolved state when left in soil or water. As the articles contain a large amount of the natural high molecular weight substance, however, it is easily biodecomposed to cause disintegration of the articles so that the volume of the articles is remarkably reduced.

It is desired that plastic molded articles generally not decompose while they are use, but they must quickly decompose after use. The molded articles of this invention are completely biodecomposable or biodisintegrable and may present a problem that if their biodecomposability is too high, biodecomposition of the articles proceeds even during their use and the physical properties of the article are considerably deteriorated. Such problem can be solved by applying a moisture-proof film onto the surface of the articles to inhibit biodecomposition from the surface thereof. The moisture-permeability of such moisture-proof film is desirably less than 50, preferably less than 30 g/(m$^2$.24 hours), 40° C. 25 μm in film thickness). The moisture-proof film may be a high molecular weight film, a low molecular weight film, a metallic film or a ceramic film and its thickness is usually 3-60 μm. An adhesive or bonding film may be interposed, if necessary, between the surface of the articles and the moisture-proof film.

Illustrative of the materials for such a high molecular weight film are, for example, polyethylene, polymethylpentene, ethylene-vinyl acetate copolymer and like olefin polymers or copolymers; aromatic polyester resins such as polyethylene terephthalate; vinyl resins such as polyvinyl chloride, polyvinylidene chloride, polytetrafluoroethylene or copolymers thereof; etc. This organic high molecular weight film can formed on the surface of the articles by coating or dry laminating.

Illustrative of the materials for a low molecular weight film are, for example, paraffin, a silicone, a low molecular weight polyethylene and a low molecular weight styrene or a copolymer thereof.

Illustrative of the material for such metallic film are, for example, aluminum, copper and the like metals. The metallic film can be formed on the surface of the articles by vacuum vapor deposition or lamination of a metal film.

illustrative of the materials for such ceramic film are, for example, alumina, silica, boron oxide and the like.

The moisture-proof film is provided at least on side of the surface of the articles. In case of the molded articles being a film or sheet, either side of the articles may be provided with the film. In case of the articles being a pipe or a container, it is preferable to form the film on the external surface thereof.

The completely biodecomposable or biodisintegrable molded articles of this invention can reduce their volume significantly by biodecomposition. Thus, the use of the molded articles of this invention can solve the difficult problem in the treatment of waste plastics. The molded articles of the present invention can simply be disposed after use by pulverizing or burying them in the soil or water. For example, the molding articles of this invention can preferably be dealt with by immersing them in a treatment water tank where microorganisms have been previously propagated in water.

The molded articles of the present invention may be in various forms, such as a film, sheet, plate, container, pipe, box, etc. The molded article in the form of a film or sheet can further be processed into a container or the like articles by secondary processing.

The following examples will further illustrate the present invention. In the examples, the abbreviations are as follows:

PP: polypropylene (EB-4237, manufactured by Mitsui Toatsu Chemicals, Inc.);

EVA: ethylene/vinyl acetate copolymer (KA-10, manufactured by Sumitomo Chemical Industries Co., Ltd.);

PCL: polycaprolactone (H-7, manufactured by Daicel Chemicals, Inc.);

TOC: total water-soluble organic carbon content.

EXAMPLE 1

A high speed mixer (SUPER MIXER SMG 100, manufactured by Kawata Kabushiki Kaisha, 100 liter volume) was modified so that the mixing vessel thereof permitted the heating of a material to be mixed at a temperature of up to 250° C. Into this vessel, 4 kg of EVA, 4 kg of PCL, 12 kg of cornstarch (CORNSTARCH W, manufactured by Nippon Shokuhin Kako K. K., average particle size: 16 $\mu$m, average volume: $2.14 \times 10^3$ $\mu$m$^3$), 0.2 kg of BHT, 0.2 kg of distearylthiodipropionate (manufactured by Ohuchi Shinko Inc.) and 0.2 kg of calcium stearate (manufactured by Nihon Yushi K. K.) were placed and mixed with heating. After about 20 minutes from the start of the mixing, the torque in the mixing motor was increased. When the temperature of the mixture was increased to 150° C., this was transferred to a cooling tank of a low revolution speed type. The mixture was further mixed while blowing air into the tank for cooling, thereby to obtain granules. The granules were processed with an extruder (SE-65, manufactured by Toshiba Kikai K. K.) to form a sheet.

EXAMPLE 2

Example 1 was repeated in the same manner as described except that the 12 kg of cornstarch were replaced by 8 kg of cornstarch and 4 kg of talc (MSA, manufactured by Nippon Talc K. K., average particle size: 9 $\mu$m, average volume: 381 $\mu$m$^3$).

COMPARATIVE EXAMPLE 1

Example 1 was repeated in the same manner as described except that the 12 kg of cornstarch and 4 kg of EVA were replaced by 6 kg of talc and 10 kg of EVA.

EXAMPLE 3

Example 1 was repeated in the same manner as described except that 4 kg of EVA and 4 kg of PCL were replaced by 8 kg of PCL.

EXAMPLE 4

Example 3 was repeated in the same manner as described except that the 12 kg of cornstarch were replaced by 8 kg of cornstarch and 4 kg of talc.

COMPARATIVE EXAMPLE 2

Example 3 was repeated in the same manner as described except that the 12 kg of cornstarch and 8 kg of PCL were replaced by 12 kg of talc and 8 kg of EVA.

COMPARATIVE EXAMPLE 3

PCL was processed by itself in the manner as described in Example 1 to form a sheet.

EXAMPLE 5

Example 1 was repeated in the same manner as described except that the 4 kg of EVA and 4 kg of PCL were replaced by 8 kg of PP.

EXAMPLE 6

Example 5 was repeated in the same manner as described except that the 12 kg of cornstarch were replaced by 8 kg of cornstarch and 4 kg of talc.

COMPARATIVE EXAMPLE 4

Example 5 was repeated in the same manner as described except that the 8 kg of PP and 12 kg of cornstarch were replaced by 16 kg of PP and 4 kg of cornstarch.

COMPARATIVE EXAMPLE 5

Example 5 was repeated in the same manner as described except that the 12 kg of cornstarch were replaced by 12 kg of talc.

EXAMPLE 7

Example 1 was repeated in the same manner as described except that the 4 kg of EVA, 4 kg of PCL and 12 kg of cornstarch were replaced by 6 kg of PCL, 6 kg of PP and 8 kg of talc.

EXAMPLE 8

Example 7 was repeated in the same manner as described except that the 6 kg of PCL, 6 kg of PP and 8 kg of talc were replaced by 8 kg of PCL and 12 kg of talc.

COMPARATIVE EXAMPLE 6

Example 7 was repeated in the same manner as described except that the 6 kg of PCL and 6 kg of PP were replaced by 12 kg of PP.

The proportions of EVA, PCL, PP, cornstarch and talc in the foregoing examples and comparative examples are shown in Table 1 below. In Table 1, the values in the brackets are contents of the components in terms of % by weight.

TABLE 1

| Example No. | Content of Components of Sheet (vol. %) | | | | |
|---|---|---|---|---|---|
| | EVA | PCL | PP | Cornstarch | Talc |
| 1 | 29 (20) | 23 (20) | — | 48 (60) | — |
| 2 | 30 (20) | 25 (20) | — | 34 (40) | 11 (20) |
| Comp. 1 | 66 (50) | 21 (20) | — | — | 13 (30) |
| 3 | — | 49 (40) | — | 51 (60) | — |
| 4 | — | 52 (40) | — | 37 (40) | 11 (20) |
| Comp. 2 | 66 (40) | — | — | — | 34 (60) |
| Comp. 3 | — | 100 (100) | — | — | — |
| 5 | — | — | 55 (40) | 45 (60) | — |
| 6 | — | — | 58 (40) | 32 (40) | 10 (20) |
| Comp. 4 | — | — | 88 (80) | 12 (20) | — |
| Comp. 5 | — | — | 66 (40) | — | 34 (60) |
| 7 | — | 35 (30) | 45 (30) | — | 20 (40) |
| 8 | — | 61 (40) | — | — | 39 (60) |
| Comp. 6 | — | — | 82 (60) | — | 18 (40) |

Each of the thus obtained sheets was tested for its tensile strength and biodegradability to give the results summarized in Table 2 (Tables 2-1 and 2-2).

The test methods are as follows:

Tensile Strength was measured in accordance with Japanese Industrial Standard JIS K-7113.

Biodegradability Test was carried out in accordance with an enzyme method. As an enzyme, 324 units of alpha-amylase of *bacillus subtilis* origin (manufactured by Seikagaku Kogyo K. K.), 30.6 units of purified lipase of *Rizopus arrhizus* origin (Sigma Inc.) or a mixture of 324 units of alpha-amylase and 30.6 units of lipase was used. The enzyme is added into 10 ml of a solution containing 1 ml of a buffer solution (pH 7.0, $KH_2PO_4$/$Na_2HPO_4$), 0.5 ml of a 1% by weight aqueous surfactant solution and 8.5 ml of water. A film sample (1 cm×3 cm×0.5 mm) is immersed in the above enzyme solution and shaken at 30° C. for 16 hours. The resulting enzyme solution was filtered and the filtrate was analyzed to determine the concentration ($C_1$) of water-soluble organic carbon. As a control, a film sample is treated in the enzyme-free solution and the concentration ($C_2$) of water-soluble organic carbon is measured. The total water-soluble organic carbon (TOC) which represents the amount of the organic carbon dissolved by the enzyme in solution is obtained by subtracting $C_2$ from $C_1$ (TOC=$C_1$-$C_2$). The biodisintegrability of the sample is evaluated from TOC, i.e. the greater TOC the higher the biodisintegrability. The sample obtained after the biodegradability test (after repeating the above treatment until no increase in TOC is observed) is dried under vacuum for 24 hours and measured for its tensile strength.

TABLE 2-1

| | Before Test | | After Test | | |
|---|---|---|---|---|---|
| Example No. | Tensile Strength (kg/cm²) | Elongation (%) | Enzyme | Tensile Strength (kg/cm²) | Elongation (%) | TOC (ppm) |
| Ex. 1 | 62 | 93 | Amylase | 16 | 26 | 224 |
| | | | Lipase | 10 | 3 | 28 |
| | | | Mixed | 13 | 4 | 504 |
| Ex. 2 | 93 | 19 | Amylase | 36 | 5 | 150 |
| | | | Lipase | 26 | 2 | 22 |
| | | | Mixed | 29 | 2 | 406 |
| Comp. 1 | 90 | 200 | Amylase | 88 | 210 | 0 |
| | | | Lipase | 35 | 50 | 26 |
| | | | Mixed | 48 | 45 | 28 |
| Ex. 3 | 106 | 48 | Amylase | 24 | 8 | 298 |
| | | | Lipase | — | — | 616 |
| | | | Mixed | — | — | 1580 |
| Ex. 4 | 121 | 16 | Amylase | 46 | 3 | 126 |
| | | | Lipase | — | — | 146 |
| | | | Mixed | — | — | 760 |
| Comp. 2 | 100 | 12 | Amylase | 97 | 10 | 0 |
| | | | Lipase | 90 | 8 | 0 |
| | | | Mixed | 93 | 8 | 0 |
| Comp. 3 | 196 | >400 | Amylase | 198 | >400 | 0 |
| | | | Lipase | — | — | 946 |
| | | | Mixed | — | — | 868 |
| Ex. 5 | 181 | 113 | Amylase | 86 | 8 | 208 |
| | | | Lipase | 180 | 108 | 0 |
| | | | Mixed | 82 | 6 | 198 |
| Ex. 6 | 196 | 118 | Amylase | 102 | 13 | 109 |
| | | | Lipase | 190 | 120 | 0 |
| | | | Mixed | 100 | 10 | 113 |
| Comp. 4 | 254 | 156 | Amylase | 231 | 142 | 66 |
| | | | Lipase | 250 | 153 | 0 |
| | | | Mixed | 226 | 140 | 55 |

TABLE 2-2

| | Before Test | | After Test | | |
|---|---|---|---|---|---|
| Example No. | Tensile Strength (kg/cm²) | Elongation (%) | Enzyme | Tensile Strength (kg/cm²) | Elongation (%) | TOC (ppm) |
| Comp. 5 | 300 | 2 | Amylase | 304 | 2 | 0 |
| | | | Lipase | 296 | 2 | 0 |
| | | | Mixed | 302 | 2 | 0 |
| Ex. 7 | 226 | 228 | Amylase | 230 | 226 | 0 |

TABLE 2-2-continued

| | Before Test | | After Test | | | |
|---|---|---|---|---|---|---|
| Example No. | Tensile Strength (kg/cm$^2$) | Elongation (%) | Enzyme | Tensile Strength (kg/cm$^2$) | Elongation (%) | TOC (ppm) |
| | | | Lipase | 98 | 69 | 625 |
| | | | Mixed | 101 | 73 | 604 |
| Ex. 8 | 134 | 12 | Amylase | 133 | 10 | 0 |
| | | | Lipase | — | — | 178 |
| | | | Mixed | — | — | 218 |
| Comp. 6 | 320 | 290 | Amylase | 321 | 288 | 0 |
| | | | Lipase | 320 | 286 | 0 |
| | | | Mixed | 324 | 292 | 0 |

What is claimed is:

1. A biodecomposable or biodisintegrable moldable material in the form of porous granules each having a diameter of 0.1-20 mm and including (a) a plurality of thermoplastic resin particles which are fuse-bonded to each other, (b) a naturally-occurring high molecular weight substance which is in the form of particles having an average volume within the range of $4.2 \times 1/10^3$ $\mu m^3$-$520 \times 10^3$ $\mu m^3$ or in the form of fibers having a diameter of less than 100 $\mu m$ and a length of less than 10 mm, and (c) a filler which is in the form of particles having an average volume within the range of $4.2 \times 1/10^3$ $\mu m^3$-$910 \times 10^3$ $\mu m^3$ or in the form of fibers having a diameter of less than 100 $\mu m$ and a length of less than 10 mm, said naturally-occurring high molecular weight substance and said filler being attached to the outer surfaces of said thermoplastic resin particles, said thermoplastic resin, said naturally-occurring high molecular weight substance and said filler being present in amounts of 30-70% by volume, 10-70% by volume and 0-45% by volume, respectively.

2. A biodecomposable moldable material according to claim 1, wherein the thermoplastic resin is a biodecomposable resin.

3. A moldable material according to claim 2 wherein said biodecomposable resin is selected from the group consisting of polyhydroxybutyrate, polyhydroxybutyrate derivatives, polycaprolactones, polyethyleneadipate, aliphatic polyesters, and copolymers of cycloaliphatic polyesters with other thermoplastic resins.

4. A biodisintegrable moldable material according to claim 1, wherein the thermoplastic resin is a mixed resin of a biodecomposable resin and a non-biodecomposable resin.

5. A moldable material according to claim 4 wherein said biodecomposable resin is a member selected from the group consisting of polyhydroxybutyrate, polyhydroxybutyrate derivatives, polycaprolactones, polyethyleneadipate, aliphatic polyesters, and copolymers of cycloaliphatic polyesters with other thermoplastic resins and wherein said non-biodecomposable resin is selected from the group consisting of polyethylene, polypropylene, polymethylpentene, ethylene-vinyl acetate copolymer, polyesters, vinyl resins, styrene resins, polyamides and polycarbonates.

6. A biodisintegrable moldable material according to claim 4, wherein the proportion of the biodecomposable resin in the mixed resin is 1-80 tw. % based on the total weight of the mixed resin.

7. A moldable material according to claim 1 wherein said naturally-occurring high molecular weight substance is selected from the group consisting of starches, starch copolymers with vinyl monomers, plant powders, cellulosic fibers, gums, animal proteins and plant proteins.

8. A biodecomposable or biodisintegrable molded article obtained from the biodecomposable or biodisintegrable moldable material as set forth in claim 1.

9. A molded article according to claim 8, wherein the article has a moisture-proof film on the surface thereof.

10. A biodecomposable or biodisintegrable moldable material in the form of porous granules, each of said granules having a diameter of 0.1-20 mm and including 30-80% by volume of a plurality of biodegradable, thermoplastic resin particles which are fuse bonded to each other and 20-70% by volume of a filler which is in the form of particles having an average volume within the range of $4.2 \times 1/10^3$ $\mu m$-$910 \times 10^3$ $\mu m^3$ or in the form of fibers having a diameter of less than 100 $\mu m$ and a length of less than 10 mm and which is attached to the outer surfaces of said thermoplastic resin particles.

11. A biodecomposable molded article obtained from the biodisintegrable moldable material as set forth in claim 10.

12. A moldable material according to claim 10 wherein said filler is selected from the group consisting of talc, calcium carbonate, clay, silica, alumina, glass powder, metal powder, thermocurable resin powder, mica, metal flake, glass fibers, carbonaceous fibers and mineral fibers.

* * * * *

UNITED STATES PATENT AND TRADEMARK OFFICE
CERTIFICATE OF CORRECTION

PATENT NO. : 5,206,087
DATED : April 27, 1993
INVENTOR(S) : TOKIWA et al

It is certified that error appears in the above-identified patent and that said Letters Patent is hereby corrected as shown below:

Col. 3, line 25, "orgainic" should read --organic--;

line 42, "comprises" should read --comprised--.

Col. 4, line 3, "orgainic" should read --organic--; and line 35, "resins" should read --resin--.

Col. 5, line 10, "orgainic" should read --organic--.

Col. 6, line 15, "fee" should read --free--.

Signed and Sealed this

Eighth Day of February, 1994

Attest:

BRUCE LEHMAN

Attesting Officer     Commissioner of Patents and Trademarks